United States Patent Office 3,580,905
Patented May 25, 1971

---

3,580,905
3(AMINOALKOXYCARBONYLALKYLENE) STEROID DERIVATIVES
Ivor James Stewart Brown, Richard Clarkson, Neville Stanton Crossley, and Bernard Joseph McLoughlin, Macclesfield, England, assignors to Imperial Chemical Industries, Limited, London, England
No Drawing. Filed June 14, 1968, Ser. No. 736,951
Claims priority, application Great Britain, June 22, 1967, 28,824/67
Int. Cl. C07c *169/00, 173/00*
U.S. Cl. 260—210.5
3 Claims

ABSTRACT OF THE DISCLOSURE

The disclosure relates to 3-aminoalkoxycarbonylmethylene derivatives of steroids, processes for their manufacture, pharmaceutical compositions containing them and a method of using them to increase the force of contraction of the heart of warm-blooded animals. Representative of the steroid derivatives disclosed are 3-(2-dimethylaminoethoxycarbonylmethylene) - 17β - (β - D - glucopyranosyloxy) - 5α - androstane and the tetra-O-acetate thereof.

---

This invention relates to new steroid derivatives and more particularly it relates to 3-substituted steroid derivatives which possess digitalis-like activity.

According to the invention we provide new steroid derivatives of the formula:

wherein $R^1$ and $R^2$, which may be the same or different, stand for alkyl radicals, or wherein $R^1$ and $R^2$ are joined, together with the adjacent nitrogen atom, to form a heterocyclic radical; wherein A stands for a straight- or branched-chain alkylene radical; and wherein

represents a steroid nucleus of which X is the carbon atom at position 3, which steroid nucleus is an oestrane, androstane, pregnane, cholane, cholestane or spirostane nucleus which may optionally bear one or more substituents selected from oxo radicals, hydroxy radicals, acyloxy radicals, glycosyloxy radicals, alkylenedioxy radicals of which the two oxygen atoms may be attached to the same carbon atom or to neighbouring carbon atoms on the steroid nucleus, alkyl radicals, alkylene radicals, halogen atoms and carboxy radicals; and wherein the said steroid nucleus may optionally be modified in one or more ways selected from the following: one or more olefinic double bonds or, where possible, acetylenic triple bonds may be present; one or more rings of the nucleus may be expanded; one or more of the carbon atoms of the nucleus may be removed; one or more rings of the nucleus may be subject to fission; one or more hetero atoms may be present in the nucleus; and the configuration at one or more of the asymmetric centres in the nucleus may be inverted; and the acid-addition salts thereof.

It is to be understood that when a hydroxy radical and a carboxy radical are both present in the steroid nucleus the product may exist as a lactone.

As a suitable value for $R^1$ or $R^2$ when it stands for an alkyl radical there may be mentioned, for example, an alkyl radical of up to 6 carbon atoms, for example the methyl or ethyl radical.

As a suitable value for the heterocyclic radical formed by $R^1$, $R^2$ and the adjacent nitrogen atom there may be mentioned, for example, a 5-, 6- or 7-membered heterocyclic radical, for example the pyrrolidino, piperidino- or morpholino- radical.

As a suitable value for the alkylene radical A there may be mentioned, for example, a straight- or branched-chain alkylene radical of at least 2 and up to 6 carbon atoms, for example the ethylene ($-CH_2CH_2-$), propylene ($-CH_2CH_2CH_2-$), 1-methylethylene

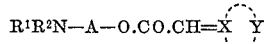

or 2-methylethylene

radical.

As a suitable acyloxy radical which may be a substituent in the steroid nucleus there may be mentioned, for example, an alkanoyloxy, alkoxycarbonyloxy or aroyloxy radical each of up to 10 carbon atoms, for example an acetoxy, ethoxycarbonyloxy or benzoyloxy radical.

As a suitable glycosyloxy radical which may be a substituent in the steroid nucleus there may be mentioned, for example, a hexosyloxy radical, for example the β-D-glucopyranosyloxy or tetra-O-acetyl-β-D-glucopyranosyloxy radical.

As a suitable alkylenedioxy radical which may be a substituent in the steroid nucleus there may be mentioned, for example, the ethylenedioxy or isopropylidenedioxy radical.

As a suitable alkyl radical which may be a substituent in the steroid nucleus there may be mentioned, for example, an alkyl radical of up to 6 carbon atoms, for example the methyl or ethyl radical.

As a suitable alkylene radical which may be a substituent in the steroid nucleus there may be mentioned, for example, an alkylene radical of up to 6 carbon atoms, for example the methylene radical.

As a suitable halogen atom which may be a substituent in the steroid nucleus there may be mentioned, for example, the fluorine or chlorine atom.

As a suitable example of a steroid derivative wherein one or more rings of the steroid nucleus is or are expanded there may be mentioned, for example, a D-homo-steroid derivative.

As a suitable example of a steroid derivative wherein one or more carbon atoms is or are removed from the steroid nucleus there may be mentioned, for example, an 18-nor-, 19-nor or B-nor-steroid derivative.

As a suitable example of a steroid derivative wherein one or more of the rings of the steroid nucleus is or are subject to fission there may be mentioned, for example, a 13,17-seco-steroid derivative.

As a suitable example of a steroid derivative which contains one or more hetero-atoms in the steroid nucleus there may be mentioned, for example, a steroid derivative wherein one or more carbon atoms of the nucleus is or are replaced by one or more hetero atoms, for example an 8-aza-steroid derivative, or a steroid derivative wherein one or more hetero atoms is or are inserted into the nucleus, for example a 12α-oxa-C-homo- or 17α-oxa-D-homo-steroid derivative.

As a suitable example of a steroid derivative wherein the configuration at one or more of the asymmetric centres in the steroid nucleus is inverted there may be mentioned, for example, a 10α-steroid derivative or a 17α-pregnane derivative.

It is to be understood that in this specification the nomenclature of steroid derivatives used is in accordance with the International Union of Pure and Applied Chemistry 1957 Rules for Nomenclature of Steroids.

As suitable acid-addition salts of the steroid derivatives of the invention there may be mentioned, for example, salts derived from inorganic acids, for example hydrochlorides, hydrobromides, phosphates or sulphates, or salts derived from organic acids, for example acetates, oxalates, citrates, lactates, tartrates, benzoates or salicylates.

Particular new steroid derivatives of the invention are the 3 - (2 - dimethylaminoethoxycarbonylmethylene)-derivatives of 5α-androstan-17β-ol;
5α-androstan-17-one;
5α-oestran-17-one;
17β-(β-D-glucopyranosyloxy)-5α-androstane;
17β-(2,3,4,6-tetra-O-acetyl-β-D-glucopyranosyloxy)-5α-androstane;
5α,10α-oestran-17-one;
D-homo-18-nor-5α-androst-13(17a)-en-17-one;
D-homo-17a-oxa-5α-androstan-17-one;
17β-ethoxycarbonyloxy-5α-androstane;
17β-benzoyloxy-5α-androstane;
17,17-ethylenedioxy-5α-androstane;
17β-hydroxy-5α-androstan-6-one;
5α-androstane-6β,17β-diol;
2α-methyl-5α-androstan-17β-ol;
D-homo-17α-oxa-5α-androstane;
13,17-seco-5α-androstane-13α,17-diol;
17α-methyl-5α-androstan-17β-ol;
17-methylene-5α-androstane;
5α-pregnan-20-one;
20β-acetoxy-5α-pregnane:
21-acetoxy-5α-pregnan-20-one;
5α-pregn-16-en-20-one;
16α,17α-isopropylidenedioxy-5α-pregnan-20-one;
5α-pregnane-18,20β-diol;
20β-hydroxy-5α-pregnan-18-oic acid 18→20 lactone;
17β-hydroxy-5α,17α-pregnane-21-carboxylic acid 21→17 lactone;
5α,22β-spirostane;
5α,22β-spirostan-12-one;
5α,22β-spirostan-11-one;
C-homo-12a-oxa-5α,22β-spirostan-12-one;
5α,22β-spirostan-128-ol;
4,4-dimethyl-5α-androstan-17β-ol;
5α-cholestane; and
methyl 7,12-dioxo-5β-cholan-24-oate, and the acid-addition salts thereof, particularly the oxalate salts thereof.

According to a further feature of the invention we provide a process for the manufacture of the steroid derivatives of the invention which comprises the interaction of a 3-oxo-steroid derivative of the formula:

wherein X and Y have the meanings stated above, with a phosphate derivative of the formula:

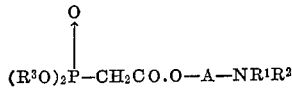

wherein R¹, and R² and A have the meanings stated above and wherein R³ stands for an alkyl radical, in the presence of a strong base.

As a suitable value for R³ there may be mentioned, for example, an alkyl radical of up to 6 carbon atoms, for example the ethyl radical.

The interaction may be carried out in an inert diluent or solvent, for example 1,2-dimethoxyethane, diethylene glycol dimethyl ether, tetrahydrofuran, diethyl ether, dimethylformamide, dimethylsulphoxide, or an excess of the phosphonate starting material, and it may be carried out at ambient temperature, or at an elevated temperature, of example at a temperature of between 80° and 100° C. The strong base may be, for example, a metal hydride, for example sodium hydride, or a metal alkoxide, for example sodium ethoxide or potassium t-butoxide, or it may be a metal amide, for example sodamide.

The phosphonate derivatives used as starting materials in the above process are themselves new compounds. According to a further feature of the invention, therefore, we provide phosphonate derivatives of the formula

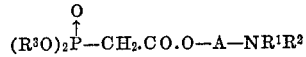

wherein R¹, R², R³ and A have the values stated above.

A preferred phosphonate derivative of the invention is diethyl 2 - dimethylaminoethoxycarbonylmethylphosphonate.

According to a further feature of the invention we provide a process for the manufacture of the phosphonate derivatives of the invention which comprises the interaction of an alcohol of the formula HO—A—NR¹R², wherein R1, R² and A have the meanings stated above, with a phosphonate derivative of the formula:

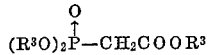

wherein R³ has the meaning stated above.

The last-mentioned process may be carried out in an inert diluent or solvent, for example cyclohexane, and it may be carried out in the presence of a strong base, for example sodium hydride or an alkali metal derivative of the alcohol of the formula HO—A—NR¹R², wherein R¹, R² and A have the meanings stated above.

According to a further feature of the invention we provide a process for the manufacture of the steroid derivatives of the invention which comprises the interaction of a carboxylic acid of the formula:

wherein X and Y have the meanings stated above, or of an activated derivative thereof, with an alcohol of the formula:

HO—A—NR¹R² wherein R¹, R² and A have the meanings stated above.

A suitable activated derivative of the carboxylic acid is, for example, an acid halide, for example the acid chloride, or the acid anhydride, or a mixed acid anhydride. The activated derivative may optionally be generated in situ by, for example, the reaction of the carboxylic acid with a sulphinyl or sulphonyl halide, for example thionyl chloride or benzenesulphonyl chloride.

The interaction may be carried out in an inert diluent or solvent for example chloroform, and it may be accelerated or completed by the application of heat, for example by heating at the boiling point of the diluent or solvent.

The carboxylic acid used as starting material may be obtained by the hydrolysis of a corresponding ester or of the corresponding nitrile, for example by hydrolysis in an alkaline medium, for example in aqueous potassium hydroxide solution.

The ester used as intermediate may be obtained by the interaction of a 3-oxo-steroid derivative of the formula:

wherein X and Y have the meanings stated above with a phosphonate derivative of the formula:

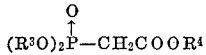

wherein R³ has the meaning stated above and wherein R⁴ stands for an alkyl radical, for example an ethyl radical, or wherein R⁴ stands for a radical of the formula —NR¹R² wherein A, R¹ and R² have the values stated above.

Alternatively, the ester may be obtained by reaction of the said 3-oxo-steroid with an alkoxyacetylene, for example ethoxyacetylene. This interaction may be carried out using the alkoxyacetylene directly in the presence of boron trifluoride ethereate as catalyst, in a diluent or solvent, for example methylene chloride, and at ambient temperature or at a lowered temperature, for example between −10 and +10° C., or it may be carried out using a metal derivative of the alkoxyacetylene, for example the lithium derivative or a Grignard derivative, for example the magnesium bromide derivative, in an ethereal solvent, followed by hydrolysis of the alkoxyethynyl derivative thus obtained with aqueous acid, for example with dilute aqueous hydrochloric acid.

The nitrile used as intermediate may be obtained by interaction of a 3-oxo-steroid derivative of the above formula with a phosphonate derivative of the formula:

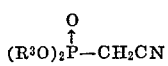

wherein $R^3$ has the meaning stated above.

As stated above, the new steroid derivatives of the invention possess digitalis-like activity, having positive inotropic, negative chronotropic and negative dromotropic effects on the myocardium. They are useful, therefore, in the clinical management of heart diseases, for example congestive heart failure and atrial arrhythmias. Some of the steroid derivatives also possess anti-inflammatory activity.

According to a further feature of the invention, therefore, we provide pharmaceutical compositions which comprise one or more of the steroid derivatives of the invention, or a salt thereof, in association with a pharmaceutically-acceptable diluent or carrier therefor.

The said pharmaceutical compositions may be in the form of tablets, capsules, aqueous or oily solutions or suspensions, emulsion, sterile injectable aqueous or oily solutions or suspensions, or dipersible powder.

The pharmaceutical compositions of the invention may additionally contain one or more drugs selected from $\beta$-adrenergic blocking agents, for example propanolol; other cardiotonic agents, for example digoxin, digitalis preparations, digitoxin and lanatoside C; diuretics, for example frusemide and ethacrynic acid, and thiazide diuretics, for example hydrochlorothiazide and bendrofluazide, and aldosterone antagonists, for example, spironolacetone; coronary vasodilators, for example nitrite and nitrate esters, for example glyceryl trinitrate, pentaerythritol tetranitrate and sorbide nitrate, xanthine derivatives, for example theophylline, theobromine and aminophylline, and dipyridamole; and potassium preparations, for example potassium chloride and potassium gluconate.

It is expected that the steroid derivatives of the invention will be administered orally or parenterally, initially in the range of 10–50 mg. per patients per day, this dose subsequently being reduced as necessary.

The invention is illustrated, but not limited, by the following examples in which the parts are by weight:

EXAMPLE 1

0.30 part of a 50% dispersion of sodium hydride in oil is added to a solution of 2.2 parts of diethyl 2-dimethyl-aminoethoxycarbonylmethylphosphonate (prepared as described in Example 16) in 50 parts of 1,2-dimethoxyethane which is maintained in an atmosphere of nitrogen. The mixture is kept at ambient temperteure for 10 minutes, and 0.6 part of 17$\beta$-hydroxy-5$\alpha$-androstan-3-one is added. The mixture is kept at ambient temperature for 45 minutes, 200 parts of water are added and the mixture is extracted with ether. The ethereal extract is washed with 100 parts of water and dried and to it is added a solution of 0.4 part of oxalic acid in 40 parts of ether. The mixture is filtered and the solid product is washed with ether and crystallised from isopropanol. There is thus obtained 3-(2 - dimethylaminoethoxycarbonylmethylene)-5$\alpha$-androstan-17$\beta$-ol oxalate hydrate, M.P. 170–172° C.

The process described above is repeated using the appropriate steroidal starting material in place of 17$\beta$-hydroxy-5$\alpha$-androstan-3-one, and there are thus obtained the compounds described in the following Tables 1 to 3. In one instance (indicated by an asterisk *) the reaction is carried out over 15 minutes instead of over 45 minutes, because a second reactive keto group is present in the molecule; in a second instance (indicated by two asterisks ) the reaction is carried out over 16 hours instead of over 45 minutes; and in a third instance (indicated by three asterisks *) the reaction is carried out over 16 hours instead of over 45 minutes and in dimethylformamide in place of 1,2-dimethoxyethane. Where no crystallisation solvent is shown the product need not be crystallised.

TABLE 1

[5$\alpha$-androstane derivatives]

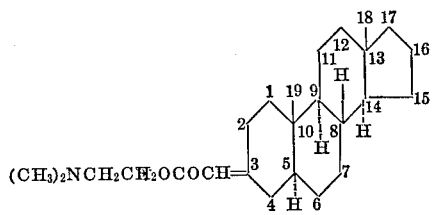

| Substituent | Salt | M.P., ° C. | Crystallisation solvent | Description of starting material (if novel) |
|---|---|---|---|---|
| 17-oxo- | Oxalate | 200–205 | Methanol/isopropanol | |
| 17-oxo-19-nor- | Oxalate hemihydrate | 170–187 | | |
| 17$\beta$-($\beta$-D-glucopyranosyloxy)-*** | do | 197–207 | Methanol/ethyl acetate | Example 2. |
| 17$\beta$-(2, 3, 4, 6-tetra-O-acetyl-$\beta$-D-glucopyranosyloxy)- | Oxalate sesquihydrate | 165–177 | do | Do. |
| 17-oxo-19-nor-10$\alpha$- | Oxalate hydrate | 145–149 | | |
| 17-oxo-D-homo-18-nor-$\Delta^{13(17a)}$- | Oxalate | 136–142 | | Example 3. |
| 17-oxo-D-homo-17a-oxa- | do | 170–172 | Methanol/ethyl acetate | |
| 17$\beta$-ethoxycarbonyloxy- | Oxalate sesquihydrate | 197–200 | | |
| 17$\beta$-benzoyloxy- | Oxalate hemihydrate | 202–205 | | |
| 17, 17-ethylenedioxy- | do | 210–212 | | Example 4. |
| 17$\beta$-hydroxy-6-oxo-* | Oxalate hydrate | 185–192 | Methanol/ethyl acetate | |
| 6$\beta$, 17$\beta$-dihydroxy- | Oxalate | 140–150 | Methanol/isopropanol | |
| 17$\beta$-hydroxy-2$\alpha$-methyl-** | Oxalate hydrate | 168–174 | do | |
| D-homo-17$\alpha$-oxa- | Oxalate | 192–194 | Methanol/ethyl acetate | Example 5. |
| 13$\alpha$, 17-dihydroxy-13, 17-seco- | Oxalate hemihydrate | 219–224 | do | Example 6. |
| 17$\beta$-hydroxy-17$\alpha$-methyl- | Oxalate | 213–216 | Methanol/isopropanol | |
| 17-methylene- | do | 210–213 | Methanol | Example 7. |

TABLE 2

[5α-pregnane derivatives]

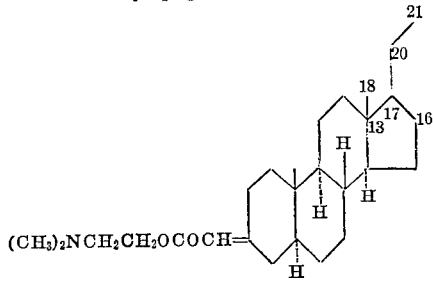

| Substituent | Salt | M.P., °C. | Crystallisation solvent | Description of starting material (if novel) |
|---|---|---|---|---|
| 20-oxo- | Oxalate | 195–205 | | |
| 20β-acetoxy- | do | 180–202 | | |
| 21-acetoxy-20-oxo- | Oxalate hemihydrate | 186–189 | Methanol/ethyl acetate | Example 8. |
| 20-oxo-Δ¹⁶- | Oxalate hydrate | 185–190 | | |
| 16α,17α-isopropylidenedioxy-20-oxo- | Oxalate hemihydrate | 180–192 | | Example 9. |
| 18,20β-dihydroxy- | Oxalate hydrate | 123–128 | Methanol/ethyl acetate | Example 10. |
| 20β-hydroxy-18-oic acid 18→20-lactone. | Oxalate | ¹ 218–219.5 | do | |
| 21-carboxy-17β-hydroxy-17α-21→17-lactone. | Citrate trihydrate | ¹ 120 | | Example 11. |

¹ With decomposition.

TABLE 3

[5α, 22β-spirostane derivatives]

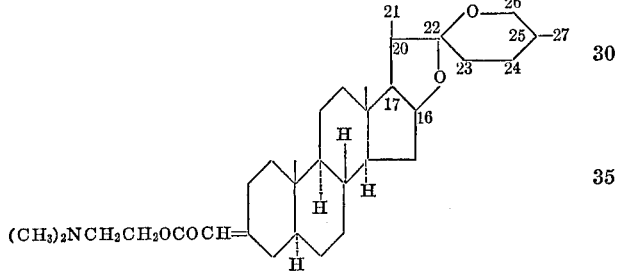

| Substituent | Salt | M.P., °C. |
|---|---|---|
| None | Oxalate | 210–217 |
| 12-oxo | Oxalate dihydrate | 198–222 |
| 12-oxo-C-homo-12α-oxa | Oxalate hydrate | 206–215 |
| 11-oxo | Oxalate sesquihydrate | 209–213 |

EXAMPLE 2

A mixture of 2 parts of 17β-hydroxy-5α-androstan-3-one, 4 parts of powdered calcium sulphate, 4 parts of 2,3,4,6-tetra-O-acetyl-β-D-glucopyranosyl bromide, 4 parts of freshly prepared silver oxide and 50 parts of dry, ethanol-free chloroform is stirred at ambient temperature for 17 hours. The suspension is filtered and the filtrate is evaporated to dryness. The residual oil is stirred with ethanol and the mixture is filtered. The solid is crystallised from methanol and there is thus obtained 17β-(2,3,4,6-tetra-O-acetyl-β-D-glucopyranosyloxy)-5α - androstan - 3-one, M.P. 185–186° C.

5 parts of 10% aqueous sodium hydroxide solution are added to a solution of 1 part of the above compound in 30 parts of hot methanol and the mixture is heated under reflux for 1 hour, cooled and filtered. The solid is crystallised from ethanol and there is thus obtained 17-β-(β-D-glucopyranosyloxy) - 5α - androstan - 3 - one, M.P. 251–253° C.

EXAMPLE 3

3β - hydroxy - D - homo - 18 - nor - 5α - androst - 13(17a)-en-17-one is oxidised with an 8 N-solution of chromium trioxide in aqueous 8 N-sulphuric acid (Jones' reagent) in acetone by conventional means. There is thus obtained D - homo - 18-nor-5α-androst-13(17a)-ene-3,17-dione, M.P. 199–201° C.

EXAMPLE 4

The 17,17-ethylenedioxy-derivative of androsterone (3β-hydroxy-androstan-17-one) is prepared from androsterone, ethylene glycol and toluene-p-sulphonic acid by conventional means, and the crude product is oxidised with aqueous 8 N-chromium trioxide in pyridine by conventional means. There is thus obtained 17,17-ethylenedioxy-5α-androstan-3-one, M.P. 198–199° C.

EXAMPLE 5

2.0 parts of 3β-hydroxy-D-homo-17a-oxa-5α-androstan-17-one, 500 parts of glacial acetic acid, 3.0 parts of 60% aqueous perchloric acid and 1.8 parts of Adams platinum oxide catalyst are shaken in an atmosphere of hydrogen at atmospheric pressure for 18 hours. The mixture is filtered, water is added to the filtrate and the mixture is extracted three times with 300 parts of ethyl acetate each time. The combined extracts are washed with aqueous sodium bicarbonate solution and then with water, dried over magnesium sulphate and evaporated to dryness. The residue is dissolved in benzene and the solution is chromatographed on 220 parts of magnesium silicate ("Florisil"; "Florisil" is a reigstered trademark). The column is eluted with a 5% solution of ethyl acetate in benzene and the eluates are discarded. The column is then eluted with 1,000 parts of a 20% solution of ethyl acetate in benzene and the eluate is evaporated to dryness. The residue is crystallised from petroleum ether (B.P. 40–60° C.) and there is thus obtained 3β-actoxy-D-homo-17a-oxa-5α-androstane, M.P. 141–144° C.

A mixture of 1.08 parts of the above compound, 0.27 part of potassium hydroxide, 54 parts of water and 350 parts of methanol is heated under reflux in an atmosphere of nitrogen for 1 hour. Water is added and the mixture is extracted with ether. The ethereal extract is dried and evaporated to dryness and petroleum ether (B.P. 60–80° C.). There is thus obtained D-homo-17a-oxa-5α-androstan-3β-ol, M.P. 182° C.

The above compound is oxidised an 8 N-solution of chromium trioxide in aqueous 8 N-sulphuric acid (Jones' reagent) in acetone by conventional means. The product is crystallised from petroleum ether (B.P. 40–60° C.) and there is thus obtained D-homo-17a-oxa-5α-androstan-3-one, M.P. 151–153° C.

EXAMPLE 6

A mixture of 2.9 parts of D-homo-17a-oxa-5α-androstan-3,17-dione, 300 parts of methanol and 0.6 part of toluene-p-sulphonic acid is stirred at ambient temperature for 1 hour. Excess aqueous sodium bicarbonate solution is added and the mixture is extracted with ether. The ethereal extract is dried and evaporated to dryness and the residue is crystallised from ethyl acetate. There is thus obtained 3,3-dimethoxy-D-homo-17a-oxa-5α-androstan-17-one, M.P. 169–176° C.

A mixture of 0.1 part of the above compound, 0.1 part of lithium aluminum hydride and 150 parts of dry tetrahydrofuran is stirred at ambient temperature for 75 minutes. 20 parts of water are gradually added, followed by 50 parts of aqueous 2 N-hydrochloric acid, and the mixture is stirred at ambient temperature for 1 hour. The mixture is extracted with ether and the ethereal extract is dried and evaporated to dryness. The residue is stirred with petroleum ether (B.P. 60–80° C.) and the mixture is filtered. The residue is crystallised from a mixture of ethyl acetate and benzene and there is thus obtained 13α,17 - dihydroxy - 13,17-seco-5α-androstan-3-one, M.P. 145–149° C.

EXAMPLE 7

0.37 part of an 8 N-solution of chromium trioxide in aqueous 8 N-sulphuric acid (Jones' reagent) is added to a solution of 1 part of 17-methylene-5α-androstan-3β-ol in 100 parts of actone which is maintained at 0° C. Anhydrous magnesium sulphate and charcoal are added, the mixture is filtered and the filtrate is evaporated to dryness. The residue is crystallised from methanol and there is thus obtained 17-methylene-5α-androstan-3-one, M.P. 131–133° C.

EXAMPLE 8

18.6 parts of boron trifluoride etherate are added to a mixture of 3.18 parts of 3β-hydroxy-5α-pregnan-20-one, 4.65 parts of freshly dried lead tetracetate, 125 parts of anhydrous benzene and 6 parts of methanol and the mixture is stirred at ambient temperature for 3 days. The mixture is poured into water and the resulting mixture is extracted with benzene. The benzene extract is dried and evaporated to dryness and the residue is crystallised from methanol. There is thus obtained 20-acetoxy-3β-hydroxy-5α-pregnan-20-one, M.P. 203–207° C.

The above compound is oxidised with an 8 N-solution of chromium trioxide in aqueous 8 N-sulphuric acid (Jones' reagent) in acetone by conventional means and the product is crystallised from methanol. There is thus obtained 20-acetoxy-5α-pregnan-3,20-dione, M.P. 196–199° C.

EXAMPLE 9

A mixture of 2.23 parts of 16α,17α-epoxy-3β-hydroxy-5α-pregnan-20-one, 2.11 parts of ethoxycarbonylhydrazine, 70 parts of dioxan and 56 parts of aqueous N-sulphuric acid is stirred at ambient temperature for 17 hours. Water and ethyl acetate are added and the ethyl acetate layer is separated, washed with water, dried and evaporated to dryness. The residue is dissolved in 85 parts of acetone, 2 parts of 70% aqueous perchloric acid are added, and the mixture is stirred at ambient temperature for 2 hours. The mixture is evaporated to dryness, water and chloroform are added and the chloroform layer is separated, dried and evaporated to dryness. The residue is dissolved in benzene and the solution is chromatographed on a column of 100 parts of magnesium silicate ("Florisil"; "Florisil" is a registered trademark). The column is eluted with a 15% solution of ethyl acetate in hexane. The eluate is evaporated to dryness and the residue is crystallised from ether. There is thus obtained 3β - hydroxy - 16α,17α-isopropyl-idenedioxy-5α-pregnan-20-one, M.P. 194–195° C.

The above compound is oxidised with an 8 N-solution of chromium trioxide in aqueous 8 N-sulphuric acid (Jones' reagent) in acetone in the presence of magnesium sulphate by conventional means. The product is crystallised from petroleum ether (B.P. 60–80° C.) and there is thus obtained 16α,17α-isopropylidenedioxy-5α-pregnan-3,20-dione, M.P. 183–184° C.

EXAMPLE 10

0.5 part of ethylene glycol and 0.1 part toluene p-sulphonic acid are added to a solution of 1 part of 20β-hydroxy-3-oxo-5α-pregnan-18-oic acid 18→20 lactone in 50 parts of dry benzene and the mixture is heated under reflux in an apparatus containing a Dean and Stark water separator for 6 hours. The mixture is cooled, washed twice with 30 parts of saturated aqueous bicarbonate solution each time, dried over anhydrous potassium carbonate and evaporated to dryness under reduced pressure. The residue is crystallised from a mixture of benzene and petroleum ether (B.P. 80–100° C.) and there is thus obtained 3,3 - ethylenedioxy - 20β - hydroxy - 5α - pregnan-18-oic acid 18→20 lactone, M.P. 227–229° C.

2 parts of lithium aluminum hydride are added to a solution of 3.5 parts of the above product in 100 parts of dry tetrahydrofuran and the mixture is stirred and heated under reflux for one hour. The mixture is stirred and cooled in an ice-bath and water is carefully added dropwise in order to destroy the excess lithium aluminum hydride. The mixture is poured into 100 parts of aqueous 2 N-sulphuric acid and the resulting mixture is extracted three times with 50 parts of ether each time. The combined ethereal extracts are washed with 30 parts of water, dried over anhydrous potassium carbonate and evaporated to dryness. The residue is crystallised from aqueous methanol and there is thus obtained 3,3-ethylenedioxy-5α-pregnane-18,20β-diol, M.P. 211–212° C.

0.1 part of aqueous 11 N-hydrochloric acid is added to a stirred solution of 2.6 parts of the above product in 100 parts of methanol. The mixture is stirred at ambient temperature for 2 hours, and a further 0.1 part of aqueous 11 N-hydrochloric acid is then added. The mixture is stirred at ambient temperature for 2 hours and yet a further 0.1 part of aqueous 11 N-hydrochloric acid is added. The mixture is stirred at ambient temperature for 2 hours, 400 parts of water are added and the mixture is extracted three times with 100 parts of chloroform each time. The combined chloroform extracts are washed successively with 50 parts of saturated aqueous sodium bicarbonate solution, 50 parts of brine and 50 parts of brine, and are then dried and evaporated to dryness under reduced pressure. The residue is crystallised from aqueous methanol and there is thus obtained 18,20β-dihydroxy-5α-pregnan-3-one, M.P. 219–221° C.

EXAMPLE 11

A solution of 0.87 part of 3β-hydroxy-5α-androstan-17-one in 10 parts tetrahydrofuran is added to a solution of 3-(2-tetrahydropyranyloxy)prop-1-ynyl magnesium bromide (prepared from 3.95 parts of 2-tetrahydropyranyl ether and 9.6 parts of a 2.5 M solution of methylmagnesium bromide in tetrahydrofuran) in 50 parts of tetrahydrofuran. The mixture is heated under reflux for 20 hours, 10% aqueous ammonium chloride solution and ether are added, and the ethereal layer is separated, washed with water, dried and evaporated to dryness. The residue is dissolved in benzene and the solution is chromatographed on a column of 20 parts of magnesium silicate ("Florisil"; "Florisil" is a registered trademark). The column is eluded with a 3% solution of ethyl acetate in petroleum ether (B.P. 60–80° C.) and the eluate is discarded. The column is then eluted with a 50% solution of ethyl acetate in petroleum ether (B.P. 60–80° C.) and the eluate is evaporated to dryness. The residue is crystallised from petroleum ether (B.P. 40–60° C.) and there is thus obtained 17α-13-(2-tetrahydropyranyloxy)-prop-1-ynyl]-5α-androstane-3β,17β-diol, M.P. 75–78° C. (with decomposition).

A solution of 2.15 parts of the above compound in 100 parts of ethanol is shaken with 0.05 part of Adams platinum oxide catalyst in an atmosphere of hydrogen until uptake of hydrogen ceases. The mixture is filtered and the filtrate is evaporated to dryness. The residue is crystallised from aqueous methanol and there is thus obtained 17β - [3 - (2 - tetrahydropyranyloxy)propyl] - 5α - androstane-3β,17β-diol, M.P. 135–139° C.

A solution of 0.432 part of the above compound in a mixture of 23 parts of chloroform and 10 parts of aqueous N-hydrochloric acid is stirred and heated under reflux in an atmosphere of nitrogen for 18 hours. The mixture is evaporated to dryness, 10 parts of water are added and the mixture is stirred. The water is decanted off, the residue is stirred with methanol and the mixture is filtered. There is thus obtained crude 17α-(3-hydroxypropyl)-5α-androstane-3β,17β-diol which is used without further purification.

1.1 parts of an 8 N-solution of chromium trioxide in aqueous 8 N-sulfuric acid are added to a solution of 0.35 part of the above compound in 50 parts of acetone and the mixture is kept for 15 minutes at 0° C. and then for 2 hours at ambient temperature. Isopropanol is added to destroy the excess oxidising agent, water is then added and the pH of the solution is adjusted to 1 with concentrated aqueous hydrochloric acid. The mixture is kept at ambient temperature for 10 minutes and is then extracted with chloroform. The chloroform extract is dried and evaporated to dryness and the residue is crystallised from aqueous methanol. There is thus obtained 21-carboxy-17β-hydroxy-5α,17α-pregnan-3-one 21→17 lactone, M.P. 173–176° C.

EXAMPLE 12

The process described in Example 1 is repeated except that 0.5 part of 5α-cholestan-3-one is used as starting material in place of the 0.6 part of 17β-hydroxy-5α-androstan-3-one. The product is crystallised from a mixture of methanol and ethyl acetate and there is thus obtained 3 - (2 - dimethylaminoethoxycarbonylmethylene) - 5α-cholestane oxalate, M.P. 200–210° C.

EXAMPLE 13

The process described in Example 1 is repeated except that methyl 7,12-dioxo-5β-cholan-24-oate is used as starting material in place of 17β-hydroxy-5β-androstan-3-one. The product is crystallised from a mixture of methanol and ethyl acetate and there is thus obtained methyl 3-(2-dimethylaminoethoxycarbonylmethylene) - 7,12 - dioxo-5β-cholan-24-oate oxalate trihydrate, M.P. 75–80° C.

EXAMPLE 14

0.05 part of triethylamine is added to a solution of 0.18 part of 3-carboxymethylene-4,4-dimethyl-5α-androstan-17β-ol in 7.5 parts of dry ethanol-free chloroform, and the mixture is cooled to −10° C. in an atmosphere of nitrogen. 0.088 part of benzenesulphonylchloride is added and the mixture is stirred at −10° C. for 20 minutes. 0.089 part of 2-dimethylaminoethanol is then added and the mixture is stirred at −10° C. for 1 hour and is then heated under reflux for 18 hours. The mixture is washed with aqueous sodium carbonate solution, dried over potassium carbonate and evaporated to dryness. The residue is dissolved in ether and a solution of oxalic acid in ether is added. The mixture is filtered and the solid product is crystallised from a mixture of ethyl acetate an methanol. There is thus obtained 3-(2-dimethylaminoethoxycarbonylmethylene)-4,4-dimethyl-5α-androstan-17β-ol, M.P. 221–222° C.

The 3-carboxymethylene-4,4-dimethyl-5α-androstan-17β-ol used as starting material may be obtained as follows:

A solution of 0.36 part of 17β-hydroxy-4,4-dimethyl-5α-androstan-3-one in 25 parts of methylene chloride is cooled to between 0 and −10° C. and 0.25 part of boron trifluoride etherate and 0.175 part of ethoxyacetylene are added. The mixture is kept at ambient temperature for 18 hours, cooled to −10° C. and further portions of 0.025 part of boron trifluoride etherate and 0.175 part of ethoxyacetylene are added. The mixture is stirred at 0° C. for one hour and then at ambient temperature for 2 hours. The mixture is washed with aqueous sodium carbonate solution, dried over potassium carbonate and evaporated to dryness. The residue is dissolved in 10 parts of benzene an the solution is chromatographed on magnesium silicate ("Florisil"; "Florisil" is a registered trademark) using benzene as eluant. The eluate is evaporated to dryness and the residue is crystallised from petroleum ether (B.P. 60–80° C.). There is thus obtained 17β-acetoxy-3-ethoxycarbonylmethylene-4,4-dimethyl-5α-androstane, M.P. 167–169° C.

3 parts of 5% aqueous potassium hydroxide solution are added to a solution of 0.187 part of the above compound in 20 parts of methanol and the mixture is heated under reflux for 18 hours in an atmosphere of nitrogen. The solution is cooled, water is added and the mixture is washed with ether. The aqueous phase is acidified and the mixture is extracted with ether. The ethereal solution is dried and evaporated to dryness and the residue is crystallised from aqueous methanol. There is thus obtained 3 - carboxymethylene - 4,4 - dimethyl - 5α - androstan - 17β-ol, M.P. 253–255° C.

EXAMPLE 15

0.58 part of 3-(2-dimethylaminoethoxycarbonylmethylene)-5α,22β-spirostan-12-one is added to a solution of 1 part of lithium tri-t-butoxy-aluminium hydride in 10 parts of tetrahydrofuran and the mixture is stirred at ambient temperature for 2 hours. The product is isolated by conventional means and dissolved in ether, and the ethereal solution is treated with a solution of 0.2 part of oxalic acid in 25 parts of ether. The mixture is filtered and there is thus obtained as solid residue 3-(2-dimethylaminoethoxycarbonylmethylene)-5α,22β-spirostan-12β-ol oxalate, M.P. 208–210° C.

EXAMPLE 16

A solution of 22.4 parts of triethyl phosphonoacetate, 9.79 parts of N,N-dimethylaminoethanol and 0.24 part of a 50% dispersion of sodium hydride in oil in 100 parts of cyclohexane is slowly distilled through an efficient fractionation column under an atmosphere of nitrogen. When the column-head temperature has risen to 80° C. (after about 1½ hours), 0.98 part of N,N-dimethylaminoethanol and 0.24 part of a 50% dispersion of sodium hydride in oil are added to the reaction mixture. This causes the column-head temperature to fall as further quantities of the cyclohexane/ethanol azeotrope distill over. When the column-head temperature has again risen to 80° C. (after about 2 hours) still further amounts of N,N-dimethylaminoethanol and a 50% dispersion of sodium hydride in oil are added, and the distillation is continued for a further 30 minutes. Throughout the reaction cyclohexane is added to the reaction mixture to keep the volume of the reaction mixture constant. The solvent is evaporated from the residue in the distillation vessel and the residue is distilled. There is thus obtained diethyl 2-dimethylaminoethoxy-carbonylmethylphosphonate, B.P. 119–123° C./0.35 mm.

The positive inotropic activity, that is, the increase in the magnitude of cardiac contractile force, of a selection of the steroid derivatives of the invention was measured by one or both of the following experimental procedures which are standard in the art for the measurement of such activity:

(A) Isolated guinea pig atrium preparation

Guinea pigs were killed by cervical fracture without the use of an anaesthetic agent and the left atrium of the heart of each animal was removed into a bath of McEwan's solution, maintained at 36° C. and saturated with a mixture of 95% v./v. oxygen and 5% v./v. carbon dioxide. The atrium was stretched between a piezoelectric crystal at one end and a pair of stimulating electrodes at the other end, and was stimulated to contract at a rate of 120 beats per minute. The contractile force was registered on a meter attached to the peizoelectric crystal, the meter being calibrated so that the percentage change in the magnitude of the contractile force could be read directly.

A period of 90 minutes was allowed for the preparation to become stabilized, and a solution of the compound under test was then added to the bath. The percentage increase in the magnitude of the contractile force was read at periods of 30 minutes and 60 minutes after addition of the compound.

The results obtained with certain steroid derivatives of the invention were as follows:

TABLE 2

| 3-(2-dimethylaminoethoxycarbonylmethylene) derivative | Rate of infusion (μg./kg./min.) | $T_{Fm}$ (min.) | $T_A$ (min.) | $T_A/T_{Fm}$ | $\Delta_{Fm}$ |
|---|---|---|---|---|---|
| 17β-hydroxy-5α-androstan-6-one | 50 | 39 | >360 | >9 | 31 |
| Methyl 7,12-dioxo-5β-cholan-24-oate | 1 | 17 | 202 | 11.9 | 21 |
| 17β-benzoyloxy-5α-androstane | 50 | 19 | 150 | 7.9 | 50 |
| 17β-(β-D-glucopyranosyloxy)-5α-androstane | 100 | 53 | 172 | 3.2 | 75 |
|  | 200 | 90 | >273 | >3 | 80 |
| 17β-(2,3,4,6-tetra-O-acetyl-β-D-glucopyranoxyloxy)-5α-androstane | 5 | 60 | >325 | >5 | 75 |
|  | 25 | 150 | >315 | >2 | 79 |
| Digoxin | 10 | 138 | 261 | 1.9 | 63 |
| Proscillaridin A | 10 | 24 | 37 | 1.5 | 82 |

The results obtained with certain steriod derivatives of the invention were as follows:

TABLE 1

| 3-(2-dimethylaminoethoxycarbonylmethylene) derivative | Concentration in bath (μg./ml.) | Percent increase in contractile force at— | |
|---|---|---|---|
|  |  | 30 min. | 60 min. |
| 5α-androstan-17β-ol | 10 | 129 | 125 |
| 5α-androstan-17-one | 10 | 57 | 56 |
| 5α-oestran-17-one | 5 | 18 | 25 |
| 5α,22β-spirostane | 20 | 20 | 22 |
| 5α,22β-sprirostan-12-one | 5 | 41 | 43 |
| 5α-cholestane | 25 | 36 | 33 |

(B) Whole guinea pig preparation

Guinea pigs were anaesthetised using urethane, 1.25 g./kg. body weight, administered intraperitoneally. The jugular vein of each animal was cannulated for administration of the compound under test, the trachea was cannulated and the animal was maintained on intermittent positive pressure artificial respiration. Lead II electrocardiogram (E.C.G.) was recorded. The heart was rendered accessible on the left side through an aperture between the 2nd and 5th ribs, ribs 3 and 4 being removed. The pericardium was slit, and a double lever system was sutured to the ventricular myocardium. One lever was fixed and served to anchor the heart; the other was connected to a strain gauge element to record isometric contractile force changes. Continuous records of contractile force and E.C.G. were made on a "Mingograph ink-ejection machine, the efficacy of the recording system being checked in each animal by injecting 0.1 mg./kg. adrenaline into the jugular vein.

Compounds under test were then infused in solution in a mixture of 10% v./v. dimethylsulphoxide and 90% v./v. physiological saline solution at a constant rate of 0.5 ml./hr. until cardiac arrhythmias developed. The following parameters were then measured:

(1) time taken from beginning of infusion to maximum increase in contractile force ($T_{Fm}$);
(2) time taken to cause development of arrhythmias ($T_A$);
(3) maximum increase in contractile force, expressed as a percentage of control contractile force ($\Delta_{Fm}$).

Because constant rate of infusion is used, the times are directly proportional to the total doses administered, and an indication of therapeutic ratio can be calculated as the ratio of $T_A$ to $T_{Fm}$, development of arrhythmias being taken as the indication of toxicity.

Results for digoxin and proscillaridin A are given in Table 2 above for purposes of comparison. It is clear from the abovementioned results that the steroid derivatives of the invention possess positive inotropic activity on the heart muscle of warm-blooded animals, and that the ratio between the dose which produces toxic symptoms (as demonstrated by the onset of cardiac arrythmias) and the effective dose is comparable with such a ratio as measured for standard cardiac glycosides.

It is recommended that, in the treatment of warm-blooded animals, including mammals, the steroid derivatives of the invention be administered orally, for example in tablet or capsule form, or parenterally, for example as a sterile injectable aqueous solution, at a total daily dose in the range of 0.1 mg. to 1 mg. per kg. of host. In particular, when used in the treatment of man, it is recommended that a total daily dose of between 10 mg. and 50 mg. per patient be used initially, the compound being administered at intervals, preferably 4 or 5 such intervals, during the day. It is expected that a lower dose than the initial dose will be used for maintenance therapy.

What we claim is:

1. A compound selected from the 3-(2-di-methylaminoethoxycarbonylmethylene)-derivatives of 5α-androstan-17β-ol;
5α-androstan-17-one;
5α-oestran-17-one;
17β-(β-D-glucopyranosyloxy)-5α-androstane;
17β-(2,3,4,6-tetra-O-acetyl-β-D-glucopyranosyloxy)-5α-androstane;
5α,10α-oestran-17-one;
17β-ethoxycarbonyloxy-5α-androstane;
17β-benzoyloxy-5α-androstane;
17,17-ethylenedioxy-5α-androstane;
17β-hydroxy-5α-androstan-6-one;
5α-androstane-6β,17β-diol;
2α-methyl-5α-androstan-17β-ol;
17α-methyl-5α-androstan-17β-ol;
17-methylene-5α-androstane;
5α-pregnan-20-one;
20β-acetoxy-5α-pregnane;
21-acetoxy-5α-pregnan-20-one;
5α-pregn-16-en-20-one;
16α,17α-ispropylidenedioxy-5α-pregnan-20-one;
5α-pregnane-18,20β-diol;
20β-hydroxy-5α-pregnan-19-oic acid 18→20 lactone;
17β-hydroxy-5α,17α-pregnane-21-carboxylic acid 21→17 lactone;
5α,22β-spirostane;
5α,22β-spirostan-12-one;
5α-22β-spirostan-11-one;
5α,22β-spirostan-12β-ol;
4,4-dimethyl-5α-androstan-17β-ol;
5α-chloestane; and
methyl 7,12-dioxo-5β-cholan-24-oate, and the pharmaceutically acceptable acid addition salts thereof.

2. A dialkllaminoethoxycarbonylmethylene compound selected from compounds of the formula:

$$R^1R^2N.CH_2CH_2O.CO.CH=X\ Y$$

and the pharmaceutically acceptable acid addition salts thereof, wherein $R^1$ and $R^2$, which may be the same or different, are alkyl of up to 6 carbon atoms and $$X\ Y$$

is a steroid, of which X is the carbon atom at position 3, selected from:

oestrane, androstane, pregnane, cholane, cholestane, spirostane, 10α-oestrane and 17α-pregnane;
steroids as defined above which bear one to three substituents selected from hydroxy in positions 6β, 12β, 17β, 18 and 20β; oxo in positions 6, 7, 11, 12, 17 and 20; acetoxy in positions 20β and 21; ethoxycarbonyloxy, benzolyloxy, β-D-glucopyranosyloxy and tetra-O-acetyl-β-D-glucopyranoxyloxy in position 17β; 17,17-ethylene-dioxy; 16α, 17α-isopropyl-idenedioxy; methyl in positions 2α, 4α, 4β and 17β; 17α-methylene; carboxy in positions 18 and 21; and methoxycarbonyl in position 24; steroids as defined above which are fully saturated; and steroids as defined above which contain an olefinic double bond between carbon atoms 16 and 17.

3. The oxalate of a compound according to claim 2.

References Cited
UNITED STATES PATENTS 3,415,816  12/1968  Clarke _____ 260—239.5

LEWIS GOTTS, Primary Examiner

J. R. BROWN, Assistant Examiner

U.S. Cl. X.R.

424—182, 238, 241, 242, 243; 260—239.5, 239.55, 239.57, 247.2, 294.3, 326.8, 345.2, 345.8, 397.1, 468.5, 961